Patented Sept. 17, 1946

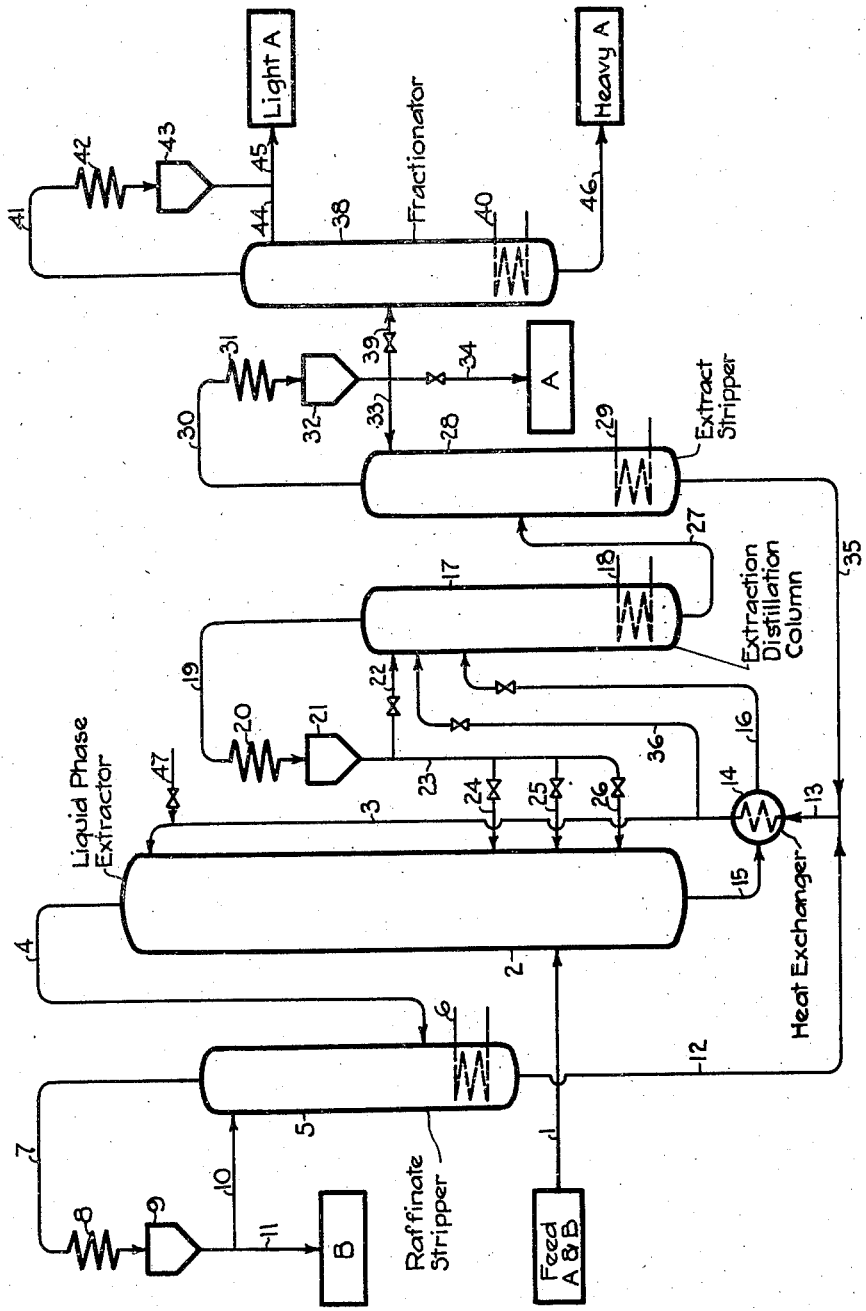
Fig. I

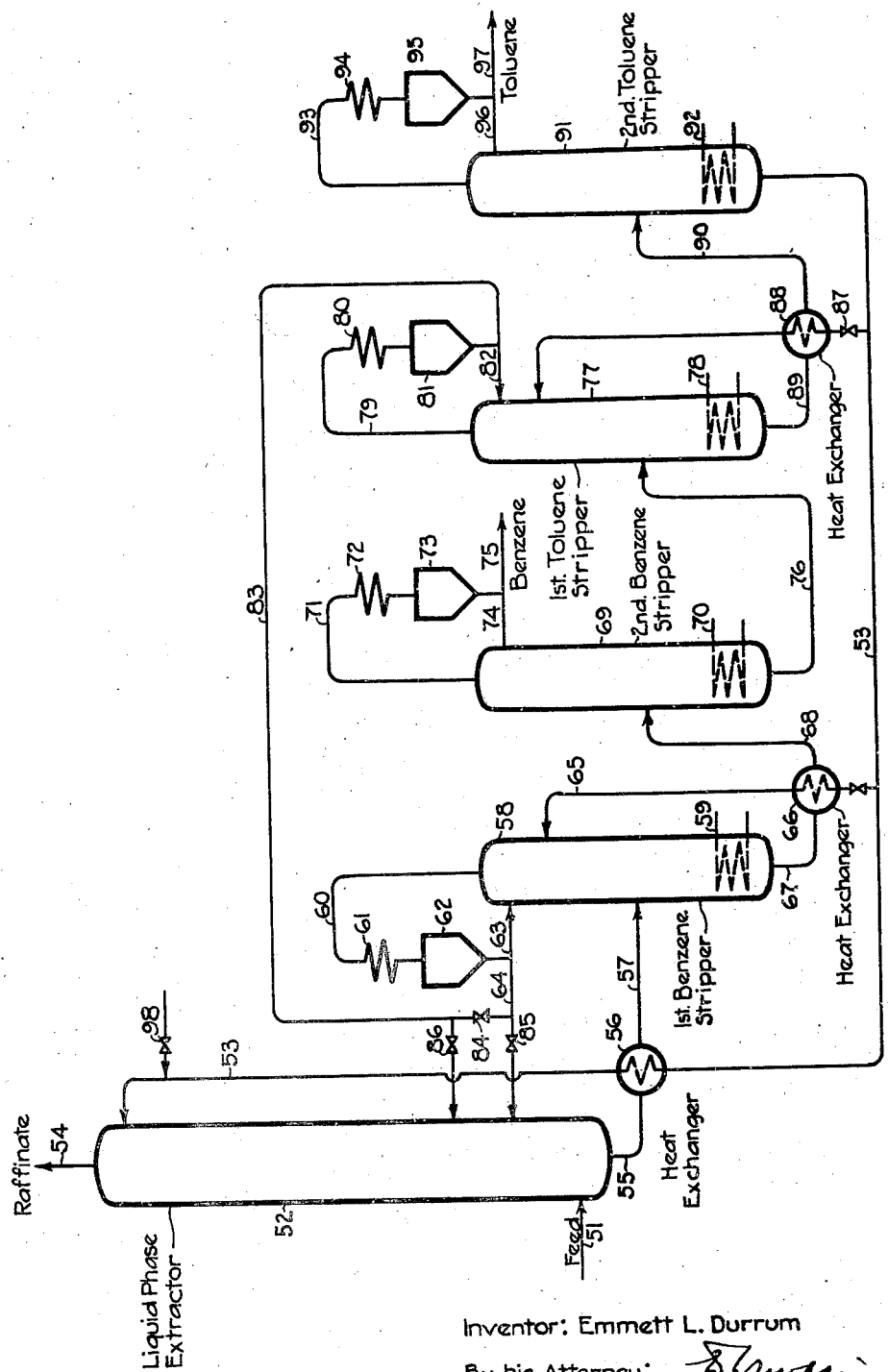
Fig. II

2,407,820

UNITED STATES PATENT OFFICE 2,407,820

PROCESS FOR SEPARATING AROMATIC HYDROCARBONS

Emmett L. Durrum, Palo Alto, Calif., assignor to Shell Development Company, San Francisco, Calif., a corporation of Delaware Application March 23, 1943, Serial No. 480,251

6 Claims. (Cl. 260—674)

This invention relates to a process for separating mixtures of different compounds by extraction with a selective solvent and is an improvement for the separation of such mixtures as are known to be separable by liquid phase extraction. More particularly, it comprises a process for separating a vaporizable organic mixture by successively extracting the mixture with the same solvent, first by liquid-liquid extraction and then by extractive distillation wherein said solvent is less volatile than the most volatile component of the mixture.

This application is a continuation-in-part of application Serial No. 420,810, filed November 28, 1941.

It has long been recognized that it is frequently impossible to separate mixtures of organic compounds having approximately the same volatilities by ordinary distillation and obtain pure products; for example, the separation of toluene of nitration grade from petroleum, or the separation of butadienes from butylenes, etc. because such compounds tend to form low-boiling azeotropic mixtures with other compounds having similar boiling temperatures, which mixtures pass overhead. Several methods have been proposed to overcome this difficulty, which usually include extractive or azeotropical distillation with liquid selective solvents of certain carefully prepared narrow-boiling mixtures having specific properties.

The instant process has several advantages over these methods, namely that it is possible to separate a mixture of compounds having a much wider boiling range than could heretofore be separated by extractive distillation alone; and the combination of liquid-liquid and vapor-liquid extraction steps in accordance with this invention greatly simplifies the procedure for obtaining products of high purity.

It is the broad purpose of this invention to separate a mixture of different compounds economically, efficiently and effectively by solvent extraction. Specific purposes are, among others, to separate aromatic from non-aromatic or olefinic from non-olefinic hydrocarbons, to produce pure compounds; to dehydrate wet compounds; to desulfurize hydrocarbon mixtures; to separate components of constant boiling mixtures or of mixtures having boiling points closer than, say 10° C., or of isomeric mixtures or mixtures of similar organic compounds having different degrees of saturation or polarity, or of other mixtures otherwise difficultly separable. Another purpose is to produce a series of pure compounds from a wide boiling range stock containing more than one compound without the necessity of prefractionating the mixture into very narrow-boiling fractions. Further purposes will be apparent from the following description.

Generally, the process of this invention comprises separating a mixture of two components, A and B, (each of which may consist of one or more compounds or components) of about the same volatility but having different degrees of solubility in a solvent S. This is done by contacting this mixture first in an extraction zone in the liquid phase with a relatively high-boiling selective solvent S which is substantially more miscible with component A than with the component B under conditions to produce two liquid layers: a raffinate layer consisting essentially of B, and some solvent S which may be removed to produce a pure product B; and an extract layer consisting essentially of S, A and a relatively minor amount of B. The extract layer is then extractively distilled in the presence of the same solvent S to produce a raffinate vapor phase consisting essentially of mixture A and B, and an extract liquid phase or residue consisting essentially of S and A. The solvent S is then removed from the extract phase to produce pure A and the resulting solvent is then returned to the liquid extraction zone for further contact with more of the original mixture. The raffinate vapor is then condensed and introduced back into the liquid extraction zone to be re-extracted, thus improving the overall yield of both A and B.

Where A and B tend to form azeotropic mixtures during the extractive distillation in the presence of solvent S, as is often the case with aromatic and non-aromatic, e. g. paraffinic, hydrocarbons, it is necessary that the following relation hold for the composition of extract produced in the first liquid-liquid extraction:

$$\frac{\text{Percent aromatic hydrocarbon in said extract}}{\text{Percent non-aromatic hydrocarbons in said extract}} > \frac{\text{Percent aromatic hydrocarbon in said azeotropes}}{\text{Percent non-aromatic hydrocarbons in said azeotrope}}$$

The present invention may be better understood from a consideration of the drawings.

Figure I is a flow diagram of the process of this invention, and Figure II is a flow diagram of a modification of this process.

Referring to Figure I, a mixture of components A and B (A being more soluble than B in a selective solvent S) is introduced via line 1 into extractor 2 which may be a packed tower or other apparatus adapted to intimately contact two at least partially immiscible liquids. In extractor 2 the mixture of A and B is countercurrently contacted with a relatively high-boiling selective solvent S for component A which is admitted via line 3 near the top of extractor 2. Component A is selectively dissolved in the solvent (along with a minor portion of component B) to form a lower extract layer and an upper raffinate layer (containing dissolved a minor portion of solvent S) which latter is withdrawn through line 4 whence it passes to stripper 5 provided with reboiler 6. Herein component B is separated from the dissolved solvent S, the former passing overhead as vapor via line 7 to condenser 8 and accumulator 9, thence a portion of condensed B passes back to stripper 5 via line 10 as reflux and the remaining portion passes to storage not shown via line 11. From the bottom of stripper 5 selective solvent S, substantially free from B, is withdrawn and recirculated to extractor 2 via lines 12 and 13, heat exchanger 14, and line 3, for use in another cycle.

The lower extract layer from extractor 2 consisting essentially of solvent S, component A and a minor amount of B, passes via line 15, heat exchanger 14, and line 16 to the extractive distillation column 17 provided with reboiler 18. If desired, this lower layer may be passed directly into distillation column 17 from the bottom of extractor 2 without passing through heat exchanger 14, in which case it may be unnecessary to return reflux through line 22 described later. The heat input and reflux ratio to distillation column 17 are so regulated that the overhead product contains essentially all of component B which was present in the lower layer, together with such an amount (less than all) of A as may go overhead. This overhead may be an azeotrope of A and B or portions thereof. Its composition is fixed by circumstances, as conditions of distillation, formation of azeotropes, etc., and it is necessary for the operativeness of this process that the extract contain a higher proportion of A to B than this overhead.

This raffinate vapor passes via line 19 to condenser 20 and into accumulator 21 from which a portion of the resulting condensate is returned to distillation column 17 as reflux through line 22. The remaining portion returns to extractor 2 via one of the branched valved lines of the manifold 23 to be contacted with further quantities of solvent in another cycle. The amount of component A relative to component B in this raffinate determines whether it should be introduced into extractor 2 above, with or below feed line 1; if the ratio of A to B in this raffinate is less than that in the feed through line 1, it should be introduced above feed line 1 through valved line 24; if the same, it should be introduced into the same portion of the extractor as feed line 1 through valved line 25; and if it is greater, it should be introduced below feed line 1 through valved line 26.

The residue or liquid extract phase from the distillation in distillation column 17 which contains an excess of component A but is substantially free from B is withdrawn along with solvent S through line 27 and passed to extract stripper 28 provided with reboiler 29. Herein the remaining component A is separated from solvent S, the former passing overhead via line 30 as vapor which is condensed in condenser 31, condensate being collected in accumulator 32 and a portion being returned as reflux via line 33. This condensate, which is substantially free from component B, is withdrawn as final product via line 34.

The solvent S substantially free from dissolved A and B is withdrawn from the bottom of stripper 28 and recirculated to extractor 2 via lines 35 and 13, heat exchanger 14, and line 3 for use in another cycle. Heat exchanger 14 may be replaced by a cooler not shown, as desired. A portion of the solvent may be bypassed through valved line 36 to flow down extractive distillation column 17 to improve the fractionation therein between components A and B. Makeup quantities of solvent S may be added via line 47 joining line 3.

If component A in accumulator 32 consists of two or more differently boiling compounds it can be withdrawn through valved line 39 and be refractionated in fractionator 38 equipped with reboiler 40 to produce an overhead fraction of the lower boiling compound and a bottom product of the higher boiling compound. The overhead fraction is taken through vapor line 41, is condensed in condenser 42 and passed to accumulator 43, a portion of which is returned to fractionator 38 via line 44 as reflux and the remainder of which is withdrawn as Light A product through line 45. The bottom product is withdrawn from the fractionator 38 through bottom line 46 as Heavy A.

Figure II, which is a modification of the process disclosed in Figure I, is adapted to illustrate how aromatic hydrocarbons, e. g. benzene and toluene, may be obtained from a feed stock containing them along with other more aromatic hydrocarbon components. A hydrocarbon mixture such as a neutral gasoline fraction having an A. S. T. M. boiling range of, say, about 50–120° C. is fed via line 51 into liquid extractor 52 which is operated in a manner similar to liquid-phase extractor 2 in Figure I. Liquid solvent such as phenol, antimony trichloride, a suitable sulfolane, etc. is admitted via line 53. Liquid raffinate and extract layers, both containing the solvent, are formed herein. The former passes from the extractor via line 54, and is treated to recover solvent therefrom as described in connection with Figure I. Extractor 52 is operated in such a manner that the extract produced has the proper aromatic concentration, as explained in connection with the extract from stripper 2 in Figure I, except that in this case both benzene and toluene must be present in excess of those amounts which, upon distillation, will form azeotropes with non-aromatic hydrocarbons present. The extract phase from extractor 52 passes via line 55, heat exchanger 56 and line 57 to first benzene stripper 58 provided with reboiler 59. The heat input and reflux ratio to stripper 58 are so regulated that non-aromatic hydrocarbons and benzene azeotropes boiling at lower temperatures than benzene are substantially the only overhead product. This product emerges through line 60, and is condensed in condenser 61, condensate passing to accumulator 62. A portion of the condensate is returned to stripper 58 as reflux via line 63. The remaining portion passes back to extractor 52 via line 64 and the manifolding system involving valve 84 and valved lines 85 and 86, to be contacted with further quantities of solvent in another cycle, thereby recovering the benzene portion of the azeotrope. If desired, some solvent may be admitted through valved line 65 and heat exchanger 66 to the upper portion of stripper 58 to improve separation between aromatic and non-aromatic hydrocarbons. The excess of benzene, together with higher boiling hydrocarbons and solvent, is withdrawn from the bottom of stripper 58. This mixture passes through line 67, heat exchanger 66, and line 68 to a second benzene stripper 69 provided with reboiler 70. The heat input and reflux ratio to stripper 69 are so regulated that substantially only benzene is taken overhead via line 71 to condenser 72. This is possible because the non-aromatic hydrocarbons which would normally form azeotropes with benzene have previously been removed in stripper 58. Condensed benzene collects in accumulator 73, whence a portion is returned to stripper 69 as reflux via line 74, while the remainder is withdrawn as product via line 75.

The residual bottom product from stripper 69 containing solvent and toluene along with non-aromatic hydrocarbons which boil at higher temperatures than benzene and at least some of which normally form azeotropes with toluene, passes from column 69 through line 76 to first toluene stripper 77 provided with reboiler 78. The heat input and reflux ratio to column 77 are so regulated that the overhead product consists essentially of a mixture of non-aromatic hydrocarbons and azeotropes formed by toluene with non-aromatic hydrocarbons boiling at lower temperatures than toluene, which product passes overhead via line 79 to condenser 80. Condensate collects in accumulator 81, whence a portion is returned to stripper 77 as reflux via line 82, while the remainder is returned via line 83 and the manifolding system involving valve 84 and including valved lines 85 and 86 to an appropriate point in the liquid-phase extractor 52 to recover the toluene contained in the azeotropic mixture. If desired, a portion of the solvent may be admitted to the upper part of stripper 77 via valved line 87 and heat exchanger 88 to improve the separation between aromatic and non-aromatic hydrocarbons. The bottom product from stripper 77, consisting essentially of a solution of toluene in solvent, which solution may or may not contain other higher boiling hydrocarbons, passes via line 89 and heat exchanger 88, and line 90 to second toluene stripper 91 provided with reboiler 92. Herein toluene is separated from the solvent, the latter recirculating via line 53 and heat exchanger 56 to contact further quantities of hydrocarbon in extractor 52. The overhead product passes through vapor line 93 to condenser 94. The overhead may consist of pure toluene or may contain higher boiling hydrocarbons not capable of forming azeotropes with toluene. In the latter case pure toluene may be separated therefrom by simple distillation in a column similar to column 39 in Figure I. Condensate collects in accumulator 95, whence a portion is returned to stripper 91 as reflux via line 96, while the remainder is withdrawn through line 96 to go to storage as pure toluene, or to be refractionated, as the case may require. Makeup quantities of solvent may be admitted to the system via valved line 98.

If desired, the solvent may be recovered from the raffinite layer and extract phase by washing it with a wash solvent (such as water, if the first solvent is water-soluble) which is immiscible with the mixture to be separated and which is readily separated from the solvent, as by distillation. Such washing apparatus would take the place of strippers 5 and 28.

In the drawings, auxiliary equipment such as auxiliary heat exchangers and valves, bypasses, pumps, control means, etc., the proper placement of which is evident to one skilled in the art, has been omitted for simplicity.

The temperatures employed in the process may range within wide limits, provided in the liquid extraction zone it is above the melting temperature of the solvent and below the boiling temperature of the mixture to be separated, and below the temperature of complete miscibility between the solvent and the mixture to be separated. The temperature in the extractive distillation column must be above the bubble temperature of the mixture and below the boiling temperature of the solvent. The extractive distillation may be carried out either adiabatically or isothermally.

Superatmospheric and subatmospheric pressures may be resorted to in order to improve the efficiency of the process. Subatmospheric pressures are usually employed to reduce the temperature required in the extractive distillation column and strippers if the mixture is not thermally stable at higher temperatures. Superatmospheric pressures are usually employed in the extraction zone if the mixture is volatile, such as $C_4$ hydrocarbons.

Useful solvent-to-feed ratios may range from about 1/5 to about 20 by volume and preferably not more than about 5.

Many different types of mixtures of compounds may be separated by the solvents of this invention provided the mixtures are liquefiable or normally liquid and are vaporizable at temperatures substantially below the boiling temperature of the solvent and are inert toward the solvent. Moreover the presence of the solvent in the mixture must cause a greater change in the "escaping tendency" of one component of the mixture relative to that of other components. By "escaping tendency" is meant the potential of one component to pass from one phase to another.

Some specific examples of mixtures which may be separated from one another by this invention comprises hydrocarbon mixtures (containing 2 or more of the following components) such as propane and propylene; butane, isobutane, alpha-, beta- and iso-butylenes, butadiene; pentanes, pentenes, isoprene, and piperylene; hexanes and hexenes; gasoline distillates containing benzene, toluene, xylenes, ethyl benzene, mesitylene, cumene, etc.; naphthenes and paraffins; mixtures containing chlorinated hydrocarbons; etc. Other mixtures which may be separated are those of organic substances containing water, such as aqueous alcohols including methyl, ethyl, propyl, etc. alcohols; organic acids including acetic, propionic, etc. acids; esters including isopropyl acetate; etc. Still other mixtures are those of oxy organic compounds such as primary and secondary butyl alcohols; methyl propyl ketone and diethyl ketone; etc. Other organic mixtures are those produced in various chemical industrial processes of the coal, lignite and petroleum industries such as organic sulfur compounds, including mercaptans, mixtures of isoprene and methyl formate, etc.

As indicated previously, the operativeness of the process is predicated on the relative compositions of the extract from the liquid-liquid extraction and the raffinate from the vapor-liquid extraction. The ratio of A to B in the former must be greater than the ratio of A to B in the latter. As a result, the greater the concentration of A in the extract from the liquid-liquid extraction, the more efficient will be the process. For this reason it is desirable that the liquid extraction step be carried out in as efficient a manner as possible. This efficiency is dependent on several factors such as the number of equivalent theoretical extraction stages, solvent-to-feed ratios, selectivity of the solvent, employment of backwash or temperature gradient or both; etc. In general, it is desirable that the extract contain at least 50% and preferably 60% or more of A.

The selective solvent employed in this process must be less volatile than the least volatile component of the mixture to be separated; that is, it should boil at least 10° C. and preferably 50° C. higher than the end boiling point of the mixture to be separated. The solvent must not react with any of the components of the mixture and must be stable at the temperature and under the pressure conditions employed in the process. The solvent must also be partially, and not more than partially, miscible with the mixture to be separated under the temperature and pressure conditions employed in the liquid extraction zone; that is, the solvent must have a substantially greater solvent power for A than for B. It is desirable that the solubility of the more soluble component of the mixture in the solvent therefore be at least ten times that of the less soluble component, thereby materially changing the "escaping tendency" of one component of the mixture relative to that of the other.

Selectivity is usually defined by the "alpha value," which is the ratio of the distribution coefficients of the components in the two phases; that is, in equilibrium contact in liquid-liquid extraction, the ratio of the percent of the less soluble component in the raffinate layer to the percent of the less soluble component in the extract layer, divided by the ratio of the percent of the more soluble component in the raffinate layer to the percent of the more soluble component in the extract layer; and similarly, in equilibrium contact in extractive distillation, the ratio of the percent of the less soluble component in the raffinate vapor to the percent of the less soluble component in the extract phase, divided by the ratio of the percent of the more soluble component in the raffinate vapor to the percent of the more soluble component in the extract phase.

The solvent preferably should have an "alpha value" of between about 15 and 35, preferably about 25, with the components of the mixture in the liquid extraction zone, and the same solvent should have an "alpha value" for the same components of the mixture in the extractive distillation zone of between about 2 and 4, preferably about 3.

Different mixtures obviously require different selective solvents, because of the requirement of phase separation in the liquid-liquid extraction step. For example, in the separation of different classes of hydrocarbons polar liquids are normally employed as solvent. Or in the dehydration of alcohols, ketones, etc. hydrocarbon liquids may be employed for this purpose, etc. When choosing a solvent from the list given below this requirement naturally must be kept in mind.

Some suitable selective solvents are: water, various alcohols as methyl, ethyl, propyl, butanol, pentanol, hexanol, furfuryl alcohol, benzyl alcohol, etc.; various ketones such as acetone, methyl ethyl ketone, diethyl ketone, dipropyl ketone, cyclopentanone, cyclohexanone, etc.; various aldehydes such as acetaldehyde, propionaldehyde, furfural, etc.; ethers such as di-isopropyl ether, dibutyl ether, diphenyl oxide, dioxane, ethylene glycol and diethylene glycol monoalkyl ethers, chlorinated dialkyl ethers, e. g. beta-beta-dichlorethyl ether, etc.; aliphatic acids such as formic, acetic, propionic acids, acetic anhydride, etc.; esters such as benzoic acid and phthalic acid esters, etc.; phenol, cresylic acids, alkyl phenol mixtures, etc.; various organic amines such as aliphatic primary amines having, say, 3 to 8 carbon atoms, aniline, alkyl anilines, morpholine, etc.; various nitriles such as acetonitrile, propionitrile, lactonitrile, butyronitrile, benzonitrile, etc.; various nitro hydrocarbons such as nitromethane, nitroethane, nitrobenzene, nitrotoluene, nitroxylenes, etc.; various pyridines and quinolines; various hydrocarbons such as simple paraffins, naphthenes and aromatics; sulfolane

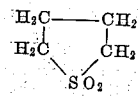

and 2-sulfolene

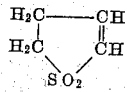

and some of their derivatives such as 2-methyl-, 3-methyl-, 2-ethyl-, 2,5-dimethyl-, 2,4-dimethyl-, 2-methyl-5-ethyl-, etc. sulfolanes; methyl-3-, propyl-3-, allyl-3-, methallyl-3-, etc. sulfolanyl ethers; ethyl-3-, tertiary butyl-3-, methallyl-3- sulfolanyl sulfides, solfolanyl sulfones; etc.

These solvents may be employed by themselves singly, or as mixtures of two or more, or in aqueous solutions, or together with auxiliary commonly known selective solvents or anti-solvents, provided they do not react with the original solvent chosen and are stable under the temperature conditions of the process.

The amount of auxiliary or anti-solvents which may be employed in conjunction with the primary solvent to make up the selective solvent may range up to 90% by volume and preferably less than 50% by volume of the primary solvent.

This process is of particular advantage in the production of pure aromatics and pure olefins and diolefins from hydrocarbon mixtures containing them, for example toluene of nitration grade from straight run or cracked, reformed, isoformed, hydroformed or otherwise converted hydrocarbon distillates; or butadiene free from butylenes from C₄ hydrocarbon fractions. This invention is also applicable to the separation of particular hydrocarbon compounds derived synthetically through isoforming or catalytic reforming of paraffins or olefins, or the dehydrogenation of paraffins or naphthenes, or other processes resulting in mixtures of aromatics, polyolefins, olefins, naphthenes and paraffins, etc.

In carrying out the process, it is evident that a certain amount of leeway may be given as to the cutpoint between the raffinate vapor and the residual extract phase in the extractive distillation column. The optimum cutpoint is that which allows substantially all of the less soluble component B to pass overhead together with a minimum of the more soluble component A. In practical operation, however, it may be difficult to separate under exactly these conditions, and therefore when high purity is desired it may be preferable to take overhead a portion thereof slightly greater than the minimum. On the other hand, when a high yield of A is the primary consideration it may be desirable to attain increased yield at the expense of purity by taking overhead slightly less, which causes some of B to appear in the bottom product.

The conditions governing any given separation according to the present invention are so complex and involve so many variables that it is impossible to state in advance more specifically the exact manner in which the process is to be carried out for any given separation. Therefore, it is desirable to carry out experiments on a laboratory scale to determine the best operating conditions required to produce a given product from a given mixture of a given purity.

*Example*

A hydrocarbon mixture having an A. S. T. M. boiling range of 100–115° C., free from components boiling above 125° C. and containing 10% by weight of toluene is extracted in the liquid phase with unsubstituted sulfolane at a solvent-to-feed ration of 1:1. There are produced: an upper raffinate liquid phase free from toluene and a lower extract phase containing about 68% toluene, based on the hydrocarbon content of the extract, and 85% solvent based on the mixture. When fractionally distilling this extract, a first overhead raffinate phase is produced consisting of the non-toluene hydrocarbons contained in the extract plus an amount of toluene in a concentration similar to that of the feed. The residue consists of the sulfolane and toluene, from which the toluene is removed by further fractional distillation. This toluene has a purity of very close to 100%.

I claim as my invention:

1. A process for separately recovering a plurality of successively higher boiling aromatic hydrocarbons from a mixture containing them and non-aromatic hydrocarbons which, upon distillation of said mixture, normally form low-boiling azeotropes with said aromatic hydrocarbons, the steps of extracting said mixture in the liquid phase with a relatively high-boiling selective solvent for aromatic hydrocarbons, under conditions to form extract and raffinate phases, said extract phase containing said aromatic hydrocarbons in excess of that quantity of said non-aromatic hydrocarbons which can form azeotropes therewith, separating said phases, distilling said extract phase under conditions to take overhead the azeotropes formed with the lowest-boiling of said aromatic hydrocarbons and to leave a first bottom product comprising said solvent and an excess of said lowest-boiling aromatic hydrocarbon substantially free from non-aromatic hydrocarbons which normally form azeotropes therewith, and higher-boiling hydrocarbons, distilling said first bottom product under conditions to take overhead said low-boiling aromatic hydrocarbon and to leave a second residual bottom product comprising solvent and residual hydrocarbons substantially free from said low-boiling aromatic hydrocarbon, distilling said second bottom product under conditions to take overhead substantially only the low-boiling azeotropes formed with the next higher-boiling aromatic hydrocarbon and to leave a third bottom product comprising solvent and an excess of said next higher-boiling aromatic hydrocarbon substantially free from the non-aromatic hydrocarbons which form azeotropes therewith, distilling said third bottom product under conditions to take overhead said next higher boiling aromatic hydrocarbon, condensing said several azeotropes and returning at least a portion of the resulting condensates to said liquid phase extraction step.

2. In a process for separately recovering a plurality of successively higher-boiling aromatic hydrocarbons from a mixture containing them and non-aromatic hydrocarbons which, upon distillation of said mixture, normally form low-boiling azeotropes with said aromatic hydrocarbons, the steps of extracting said mixture in the liquid phase in an extraction zone with a relatively high-boiling selective solvent for aromatic hydrocarbons under conditions to form extract and raffinate phases, said extract phase containing said aromatic hydrocarbon in excess of that quantity of said non-aromatic hydrocarbons which can form azeotropes therewith, separating said phases, distilling said extract phase under conditions to take overhead first azeotropes formed with the lowest boiling of said aromatic hydrocarbons and to leave a first bottom product comprising said solvent and an excess of said lowest boiling aromatic hydrocarbon substantially free from non-aromatic hydrocarbons which normally form azeotropes therewith, and higher boiling hydrocarbons, condensing said overhead azeotrope, returning at least a portion of the resulting condensate to said extraction zone, distilling said bottom product under conditions to take overhead said low-boiling aromatic hydrocarbon and to leave a second residual bottom product comprising solvent and residual hydrocarbons substantially free from said low-boiling aromatic hydrocarbon, distilling said second bottom product under conditions to take overhead second low-boiling azeotropes formed with the next higher boiling aromatic hydrocarbon and to leave a third bottom product comprising solvent and an excess of said next higher boiling aromatic hydrocarbon substantially free from the non-aromatic hydrocarbons which form azeotropes therewith, condensing said second azeotropic overhead product, returning at least a portion of the resulting condensate to said extraction zone and distilling said third bottom product under conditions to take overhead said next higher boiling aromatic hydrocarbon.

3. The process of claim 2 wherein said mixture contains benzene and toluene.

4. The process of claim 2 wherein said mixture contains benzene and toluene and said solvent comprises antimony trichloride.

5. In a process for separately recovering a plurality of successively higher-boiling aromatic hydrocarbons from a mixture containing them and non-aromatic hydrocarbons which, upon distillation of said mixture, normally form low-boiling azeotropes with said aromatic hydrocarbons, the steps of extracting said mixture in the liquid phase in an extraction zone with a relatively high-boiling selective solvent for aromatic hydrocarbons under conditions to form extract and raffinate phases, said extract phase containing said aromatic hydrocarbon in excess of that quantity of said non-aromatic hydrocarbons which can form azeotropes therewith, separating said phases, distilling said extract phase under conditions to take overhead first azeotropes formed with the lowest boiling of said aromatic hydrocarbons and to leave a first bottom product comprising said solvent and an excess of said lowest boiling aromatic hydrocarbon substantially free from non-aromatic hydrocarbons which normally form azeotropes therewith, and higher boiling hydrocarbons, condensing said overhead azeotrope, returning at least a portion of the resulting condensate to said extraction zone, distilling said bottom product under conditions to take overhead said low-boiling aromatic hydrocarbon and to leave a second residual bottom product comprising solvent and residual hydrocarbons substantially free from said low-boiling aromatic hydrocarbon, distilling said second bottom product under conditions to take overhead second low-boiling azeotropes formed with the next higher boiling aromatic hydrocarbon and to leave a third bottom product comprising solvent and an excess of said next higher boiling aromatic hydrocarbon substantially free from the non-aromatic hydrocarbons which form azeotropes therewith, and distilling said third bottom product under conditions to take overhead said next higher boiling aromatic hydrocarbon.

6. The process of claim 2 wherein the solvent comprises a sulfolane.

EMMETT L. DURRUM.